(12) United States Patent
Ishii et al.

(10) Patent No.: US 12,291,907 B2
(45) Date of Patent: May 6, 2025

(54) LIVING HINGE FORMED BY COMPRESSED MATERIAL

(71) Applicant: KYORAKU CO., LTD., Kyoto (JP)

(72) Inventors: Kenji Ishii, Nagoya (JP); Kazuo Waki, Nagoya (JP); Sho Nakajima, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 1089 days.

(21) Appl. No.: 16/759,845

(22) PCT Filed: Jan. 29, 2019

(86) PCT No.: PCT/JP2019/002894
§ 371 (c)(1),
(2) Date: Apr. 28, 2020

(87) PCT Pub. No.: WO2019/151213
PCT Pub. Date: Aug. 8, 2019

(65) Prior Publication Data
US 2021/0180377 A1    Jun. 17, 2021

(30) Foreign Application Priority Data

Jan. 30, 2018  (JP) .................................. 2018-013874
Jan. 24, 2019  (JP) .................................. 2019-009941

(51) Int. Cl.
*E05D 1/02*   (2006.01)
*B29C 48/00*  (2019.01)
(Continued)

(52) U.S. Cl.
CPC ............ *E05D 1/02* (2013.01); *B29C 48/0011* (2019.02); *B29C 48/08* (2019.02);
(Continued)

(58) Field of Classification Search
CPC .. E05D 1/00; E05D 1/02; B65D 43/16; B65D 1/22; B65D 1/24; B65D 1/26; B29C 51/28
See application file for complete search history.

(56) References Cited

U.S. PATENT DOCUMENTS 3,350,492 A * 10/1967 Grootenboer ........... B29C 53/06
                                                        264/296
3,629,901 A * 12/1971 Wolf ......................... E05D 1/02
                                                        220/838
(Continued)

FOREIGN PATENT DOCUMENTS

DE      2517078 A1     10/1976
DE      3524574 A1 *   1/1987 ............. B29C 51/28
(Continued)

OTHER PUBLICATIONS

International Search Report issued on Apr. 23, 2019 in corresponding International Application No. PCT/JP2019/002894; 4 pages.
(Continued)

*Primary Examiner* — Emily M Morgan
(74) *Attorney, Agent, or Firm* — Maier & Maier, PLLC

(57) ABSTRACT

A structure body having a resin molded body which can suppress deterioration of external appearance due to meander of the folded line formed in the hinge portion even when the resin constituting the resin molded body contains an inorganic fiber. The structure body has a resin molded body and the resin molded body includes: a first main body portion and a second main body portion; and a hinge portion; wherein the first main body portion and the second main body portion are connected at the hinge portion with each other so as to be rotatable with respect to each other; the hinge portion comprises a first thin portion, a second thin portion, and a thick portion.

12 Claims, 20 Drawing Sheets

(51) Int. Cl.
*B29C 48/08* (2019.01)
*B29K 105/06* (2006.01)
*B29L 31/22* (2006.01)

(52) U.S. Cl.
CPC ....... *B29K 2105/06* (2013.01); *B29L 2031/22* (2013.01); *E05Y 2800/27* (2013.01); *E05Y 2800/455* (2013.01); *E05Y 2800/68* (2013.01)

(56) References Cited

U.S. PATENT DOCUMENTS

| | | | | |
|---|---|---|---|---|
| 4,636,065 | A * | 1/1987 | Kanemitsu | E05D 1/02 355/75 |
| 4,966,283 | A * | 10/1990 | Sykes | G11B 23/0233 206/311 |
| 5,145,068 | A * | 9/1992 | Schmitz | G11B 23/0233 220/4.23 |
| 5,631,053 | A * | 5/1997 | Andersen | C04B 28/02 428/35.8 |
| 5,776,388 | A * | 7/1998 | Andersen | B29C 39/42 264/129 |
| 5,843,544 | A | 12/1998 | Andersen et al. | |
| 2010/0104788 | A1* | 4/2010 | Kitano | B32B 5/18 428/36.4 |
| 2013/0280472 | A1* | 10/2013 | Preisler | B32B 5/245 428/95 |
| 2014/0007376 | A1* | 1/2014 | Brewer | E05D 1/02 16/225 |
| 2014/0205809 | A1* | 7/2014 | Ishii | B32B 5/022 428/161 |
| 2017/0021077 | A1 | 1/2017 | Yamazaki et al. | |
| 2017/0175428 | A1* | 6/2017 | Quinn | B65D 43/16 |
| 2018/0283065 | A1* | 10/2018 | Christenson | B32B 5/24 |
| 2022/0186012 | A1* | 6/2022 | Fukuroda | C08L 23/12 |

FOREIGN PATENT DOCUMENTS

| | | | | |
|---|---|---|---|---|
| GB | 2296913 | A * | 7/1996 | .......... B65D 43/162 |
| GB | 2296913 | B | 7/1996 | |
| GB | 2 346 868 | A | 8/2000 | |
| JP | H10299319 | A | 11/1998 | |
| JP | 2001-207716 | A | 8/2001 | |
| JP | 2004-155476 | A | 6/2004 | |
| JP | 2007-032171 | A | 2/2007 | |
| JP | 2011-207135 | A | 10/2011 | |
| JP | 2012-240217 | A | 12/2012 | |
| JP | 2013-067148 | A | 4/2013 | |
| JP | 2013-103422 | A | 5/2013 | |
| JP | 2014-061700 | A | 4/2014 | |
| JP | 2016-068345 | A | 5/2016 | |

OTHER PUBLICATIONS

The Extended European Search Report issued on Jan. 15, 2021, including the Supplementary European Search Report and the European Search Opinion, in connection with corresponding EP Application No. 19747224.4 (9 pp.).

Office Action issued Dec. 27, 2021 in China Patent Application No. 201980009393.3 (with English translation); 20 pages.

Office Action issued on Mar. 26, 2024, in corresponding Korean Application No. 10-2020-7011518, 12 pages.

* cited by examiner hinge portion hinge portion

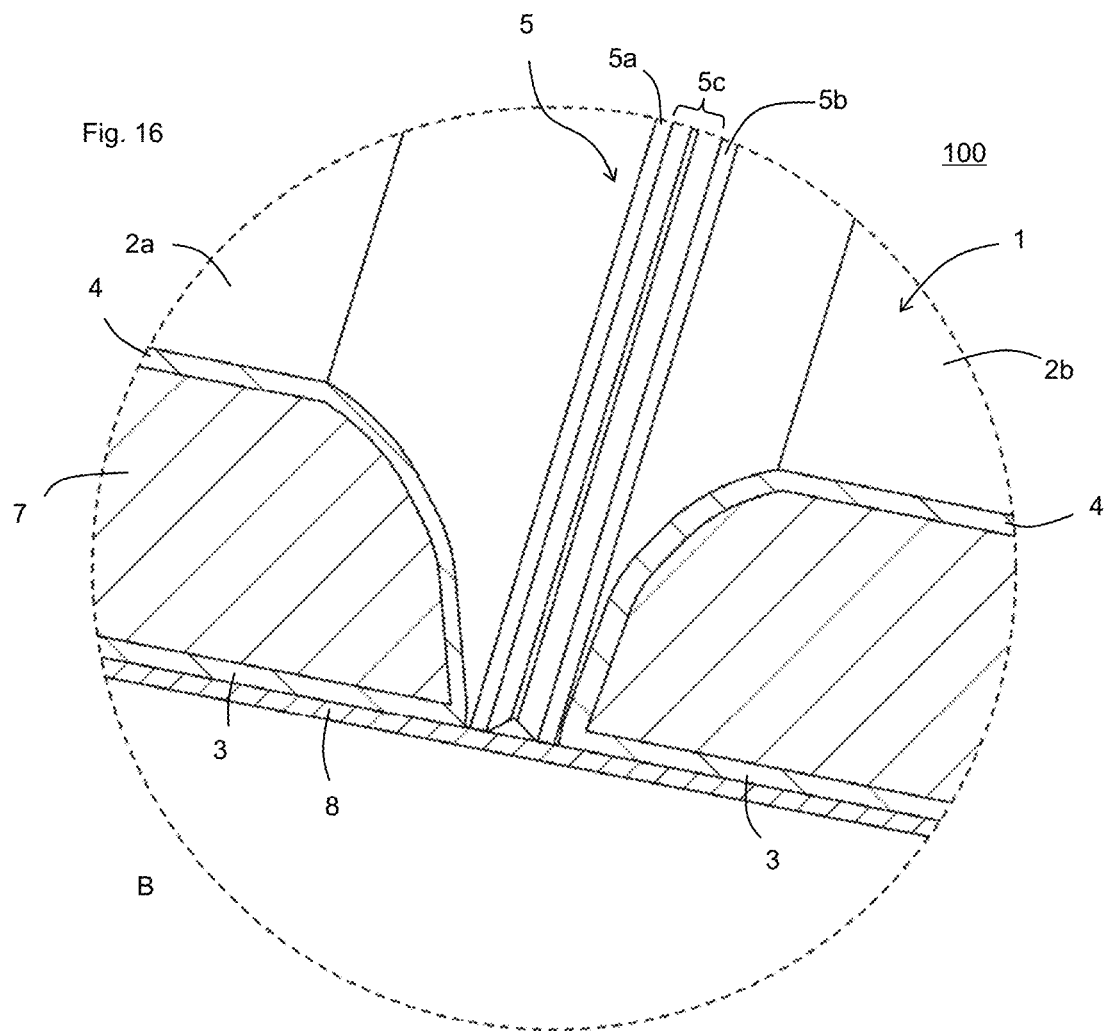

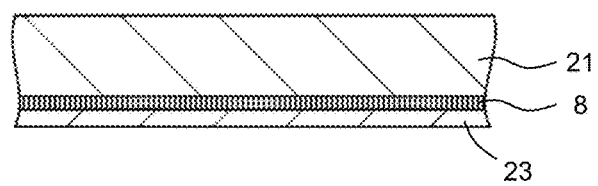
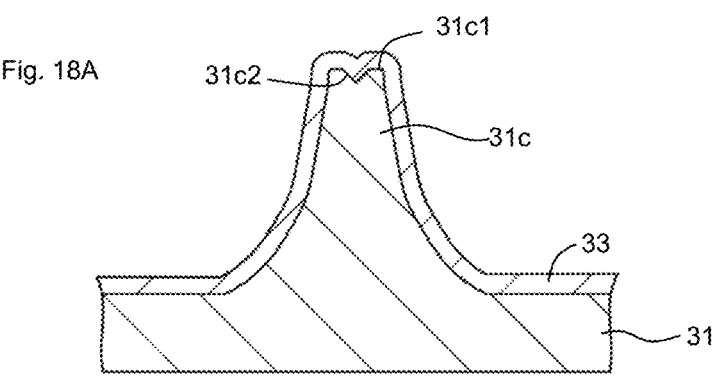
Fig. 18A
Fig. 18B
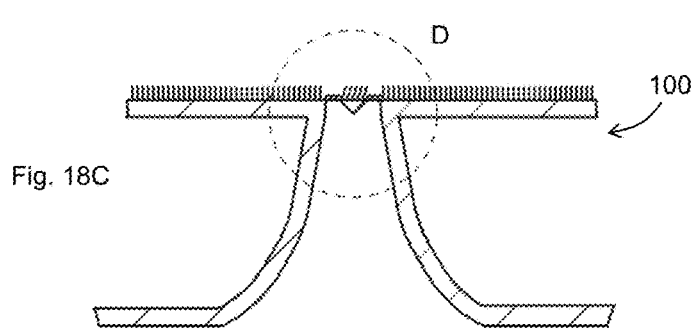
Fig. 18C
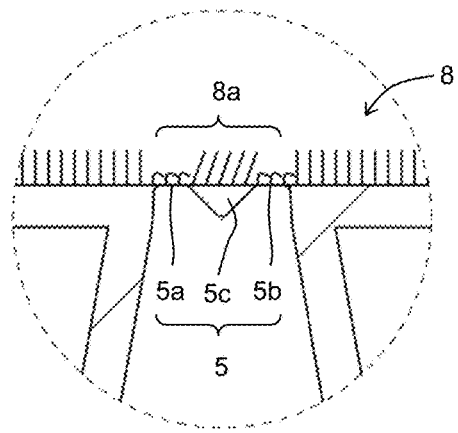
Fig. 18D

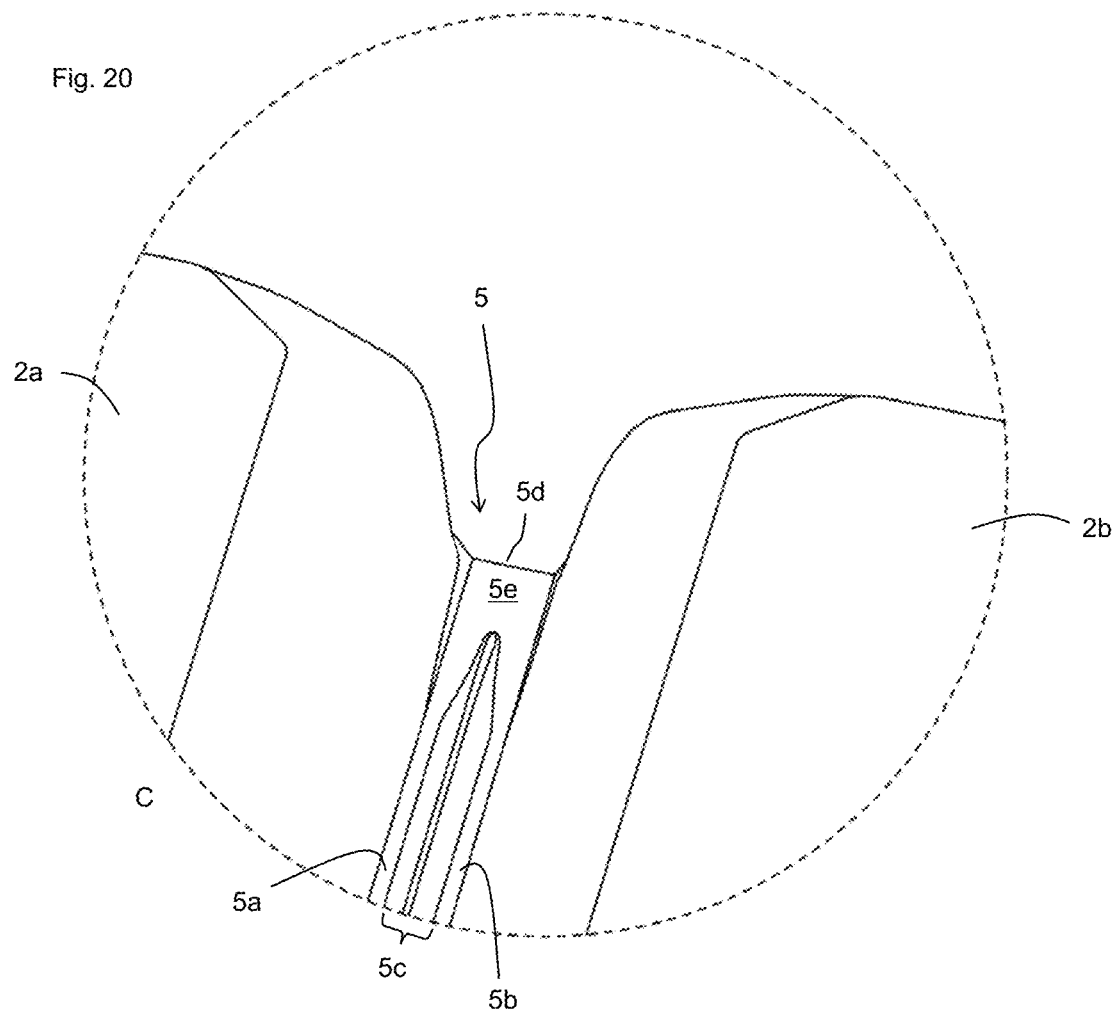

LIVING HINGE FORMED BY COMPRESSED MATERIAL

TECHNICAL FIELD

The present invention relates to a structure body having a resin molded body (resin panel for example) which can be used as a bath lid or as a floor board installed in a luggage compartment of a vehicle.

BACKGROUND

Patent Literature 1 discloses a resin molded body having a hinge portion.

CITATION LIST

Patent Literature

[Patent Literature 1] JP 2013-067148A

SUMMARY OF THE INVENTION

Technical Problem

When the resin molded body of Patent Literature 1 is bent at its hinge portion, a folded line is formed at the hinge portion. When the resin constituting the resin molded body does not contain inorganic fiber, the folded line would be formed linearly as shown in FIG. 15A, and thus no problem would occur with the external appearance. On the other hand, when the resin constituting the resin molded body contains inorganic fiber, the folded line formed would meander as shown in FIG. 15B, thereby deteriorating the external appearance.

The present invention has been made by taking the afore-mentioned circumstances into consideration. The present invention provides a structure body having a resin molded body which can suppress deterioration of external appearance due to meander of the folded line formed in the hinge portion even when the resin constituting the resin molded body contains inorganic fiber.

Solution to Problem

According to the present invention, a structure body having a resin molded body; the resin molded body comprising: a first main body portion and a second main body portion; and a hinge portion; wherein the first main body portion and the second main body portion are connected at the hinge portion with each other so as to be rotatable with respect to each other; the hinge portion comprises a first thin portion, a second thin portion, and a thick portion; the thick portion is a portion being larger in thickness than the first thin portion and the second thin portion; the first thin portion, the second thin portion, and the thick portion elongate in a longitudinal direction of the hinge portion; and the thick portion is sandwiched by the first thin portion and the second thin portion in a width direction of the hinge portion, is provided.

In the hinge portion of the resin molded body, a thick portion is sandwiched by a first and second thin portion, and the hinge portion is ben at the thin portion, easily forming a folded line. Since the width of the thin portion is smaller than the width of the entire hinge portion, the folded line formed in the thin portion would not be prominent even if it is meandered. Therefore, according to the present invention, deterioration of the external appearance due to meander of the folded line formed in the hinge portion can be suppressed.

Hereinafter, various embodiments of the present invention will be described. The embodiments described hereinafter can be combined with each other.

Preferably, the thick portion does not reach an end portion of the hinge portion in a longitudinal direction of the hinge portion.

Preferably, a width of the hinge portion decreases towards the end portion of the hinge portion in the longitudinal direction of the hinge portion, in a vicinity of the hinge portion in the longitudinal direction of the hinge portion.

Preferably, at least one of thickness or width of the thick portion becomes gradually smaller towards the end portion of the hinge portion in the longitudinal direction in a vicinity of an end portion in a longitudinal direction of the thick portion.

Preferably, when a width of the hinge portion at a portion in which the width of the hinge portion is constant and a width of the thick portion at the portion in which the width of the hinge portion is constant are taken as Wh and Wc, respectively, relation of Wc/Wh=0.2 to 0.8 is satisfied.

Preferably, a thickness of the thick portion decreases gradually towards an end of a width direction of the thick portion.

Preferably, the structure body further comprises: an outer surface material provided so as to extend over the first main body portion, the hinge portion, and the second main body portion; wherein: the outer surface material is integrally molded with the resin molded body.

Preferably, the resin molded body contains inorganic fiber; and the inorganic fiber is orientated in a direction not parallel with a longitudinal direction of the hinge portion.

According to another aspect of the present invention, a method for manufacturing a structure body mentioned above, comprising the steps of: an extruding step, a shaping step, and a clamping step; wherein: in the extruding step, a first resin sheet and a second resin sheet are extruded in between a first mold and a second mold; each of the first mold and the second mold is provided with a cavity; in the shaping step, the first resin sheet and the second resin sheet are shaped along an inner surface of the cavity of the first mold and the second mold; in the clamping step, the first mold and the second mold are clamped; the first resin sheet and the second resin sheet contain inorganic fiber; at least one of the first mold and the second mold is provided with a protrusion to form the hinge portion; and a longitudinal direction of the protrusion is not parallel with an extrusion direction of the first resin sheet and the second resin sheet, is provided.

Preferably, the longitudinal direction of the protrusion is orthogonal with the extrusion direction of the first resin sheet and the second resin sheet.

According to another aspect of the present invention, a method for manufacturing a structure body mentioned above, comprising the steps of: an extruding step, a shaping step, and a clamping step; wherein: in the extruding step, a first resin sheet and a second resin sheet are extruded in between a first mold and a second mold; each of the first mold and the second mold is provided with a cavity; in the shaping step, the first resin sheet and the second resin sheet are shaped along an inner surface of the cavity of the first mold and the second mold in a condition where an outer surface material is arranged in between the first resin sheet and the first mold; in the clamping step, the first mold and the second mold are clamped; the second mold is provided with a protrusion to form the hinge portion; and a groove facing the thick portion is provided at a tip of the protrusion, is provided.

BRIEF DESCRIPTION OF THE DRAWINGS

FIG. 16 shows a perspective view of a structure body 100 according to the second embodiment of the present invention, corresponding to FIG. 4A.

FIG. 18A to FIG. 18D show a cross-sectional view of the manufacturing process of the structure body 100 of FIG. 16.

FIG. 18A corresponds to FIG. 11 and FIG. 18B corresponds to FIG. 13, FIG. 18C shows the structure body 100 taken out from the molds 21 and 31, and FIG. 18D shows an enlarged view of region D in FIG. 18C. The insert component 7 is omitted in FIG. 18A to FIG. 18D.

FIG. 19A corresponds to FIG. 11 and FIG. 19B corresponds to FIG. 13, FIG. 19C shows the structure body 100 taken out from the molds 21 and 31, and FIG. 19D shows an enlarged view of region D in FIG. 19C. The insert component 7 is omitted in FIG. 19A to FIG. 19D.

FIG. 20 shows a figure corresponding to FIG. 5 of an alternative example of the first embodiment.

MODE FOR CARRYING OUT THE INVENTION

Hereinafter, various embodiments of the present invention will be described. Various distinctive features shown in the following embodiments can be combined with each other. In addition, an invention can be established independently for each of the distinctive features.

1. First Embodiment 1-1. Structure of Structure Body

Figure 1:
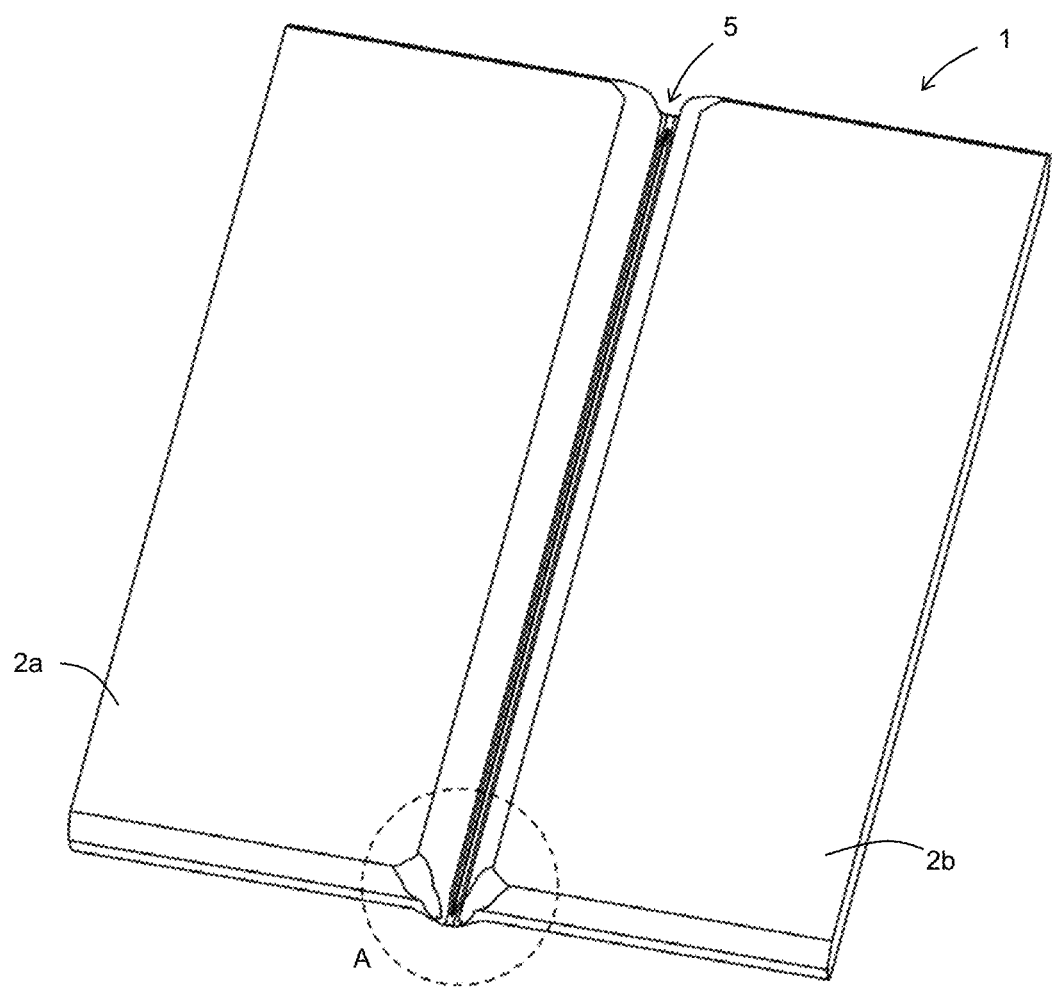
FIG. 1 shows a perspective view of the structure body according to the first embodiment of the present invention.
Figure 2:
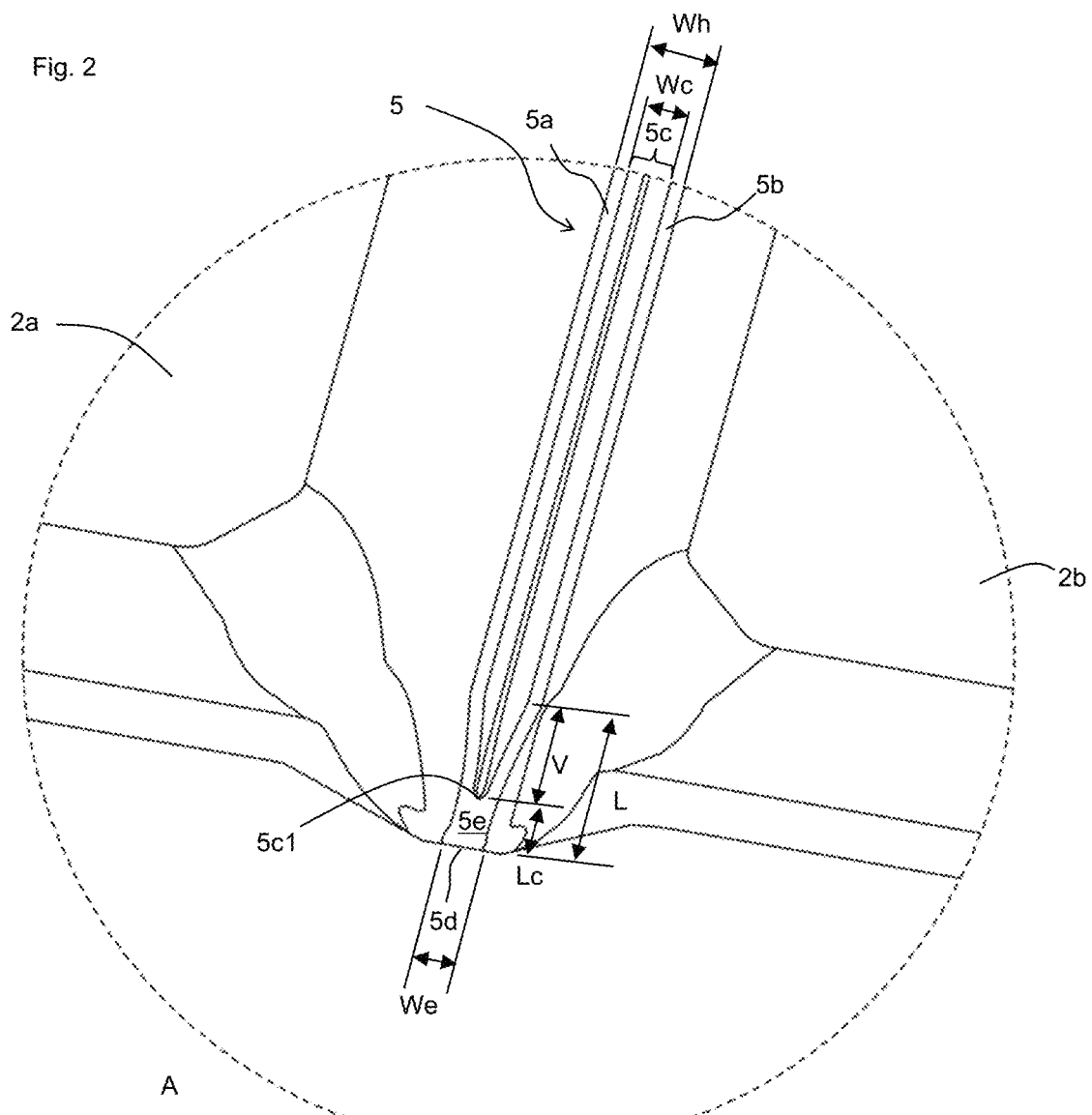
FIG. 2 shows an enlarged view of region A in FIG. 1.

As shown in FIG. 1 and FIG. 2, the structure body according to the first embodiment of the present invention has a resin molded body 1. The resin molded body 1 comprises a first and second main body portions 2a and 2b, and a hinge portion 5. The main body portions 2a and 2b are connected at the hinge portion 5 with each other so as to be rotatable with respect to each other.

In the present embodiment, the resin molded body 1 is a resin panel, and the main body portions 2a and 2b are molded bodies having a panel shape.

The resin molded body 1 comprises a front wall 3 and a back wall 4. The front wall 3 and the back wall 4 face each other with a gap. The surroundings of the front wall 3 and the back wall 4 are connected by a surrounding wall 6.

Figure 3:
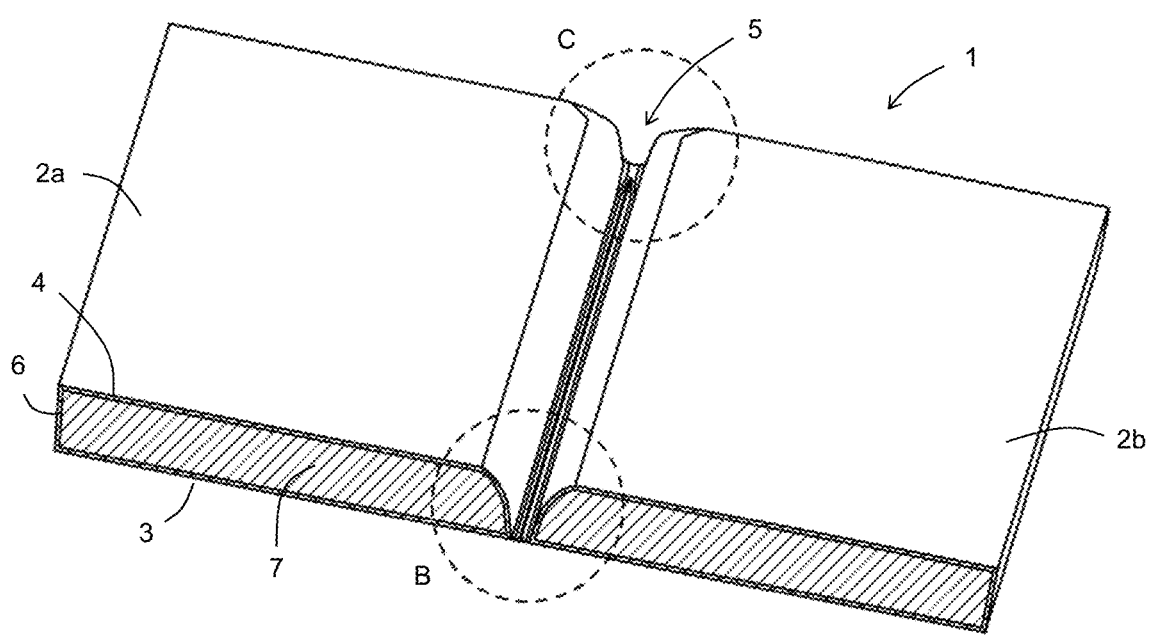
FIG. 3 shows a cross-sectional view cut at the center in a longitudinal direction of the hinge portion 5 of FIG. 1.
Figure 4A:
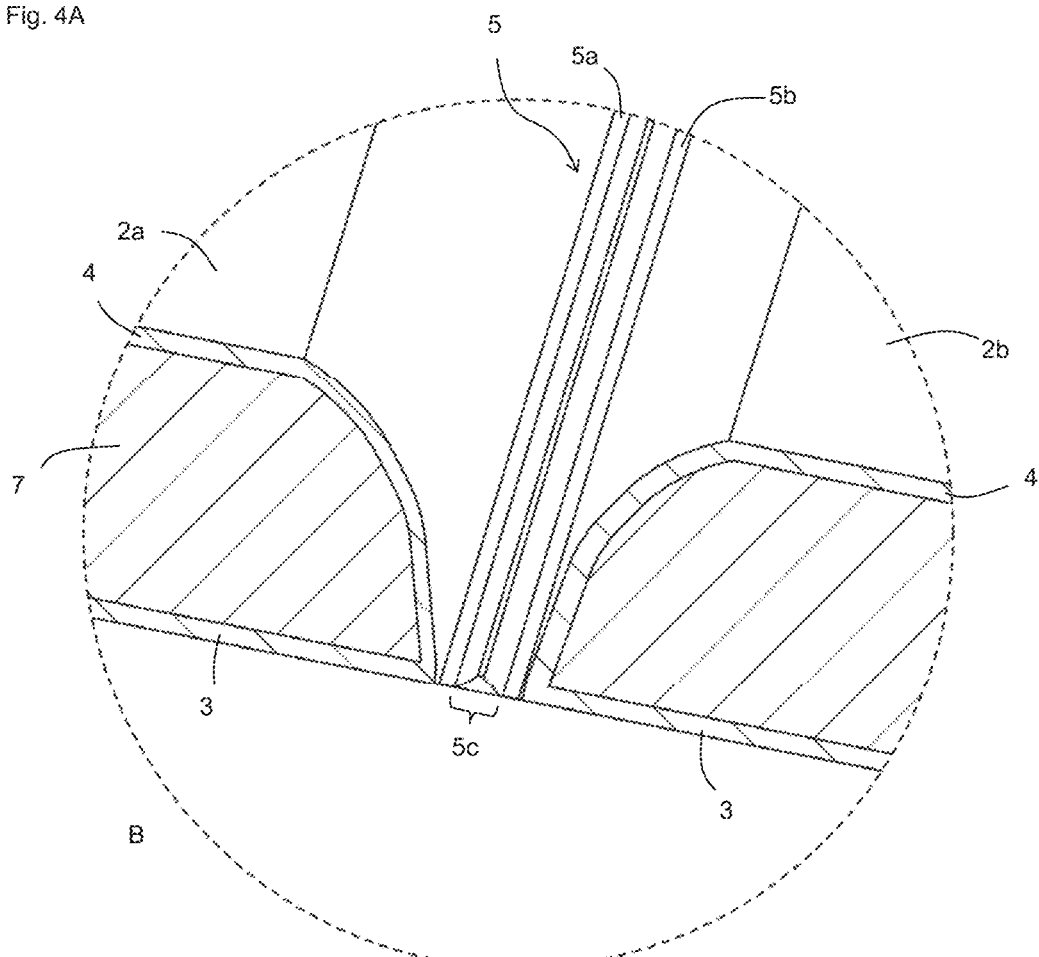
FIG. 4A shows an enlarged view of region B in FIG. 3.
Figure 4B:
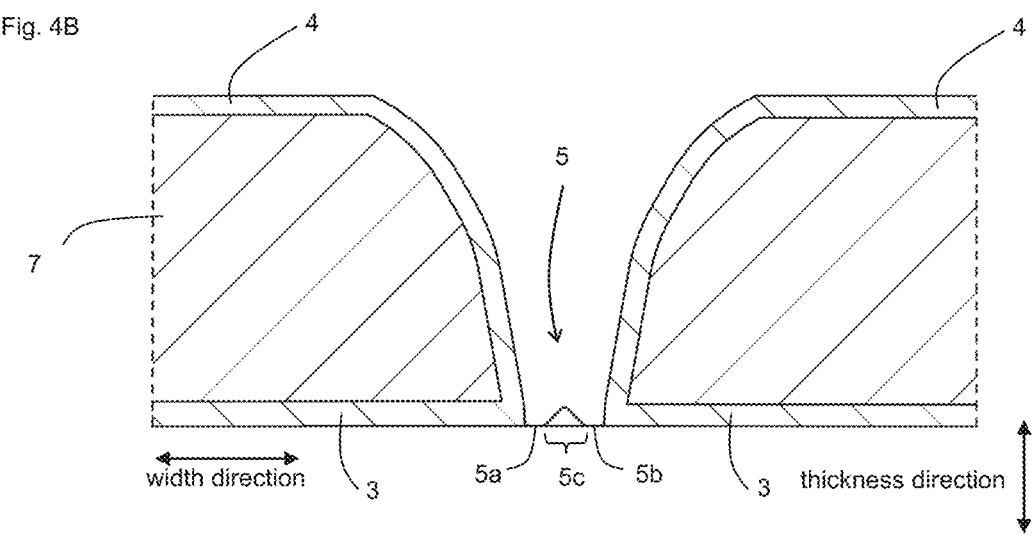
FIG. 4B shows another enlarged view of region B in FIG. 3

As shown in FIG. 3 and FIGS. 4A-B, the insert component 7 is provided in between the front wall 3 and the back wall 4. The insert component 7 is a component arranged for the purpose of providing a space in between the front wall 3 and the back wall 4, and for improving strength and heat resistance of the resin molded body 1. Preferably, the insert component 7 is constituted with a foam body.

The hinge portion 5 comprises a first and second thin portions 5a and 5b, and a thick portion 5c. The thick portion 5c is a portion having a larger thickness than the thin portions 5a and 5b. The thin portions 5a and 5b and the thick portion 5c have an elongated shape, and elongates along the longitudinal direction of the hinge portion 5. The thick portion 5c is sandwiched by the thin portions 5a and 5b in the width direction of the hinge portion 5.

As shown in FIGS. 4A-B and FIG. 7, the thick portion 5c has an approximately triangle-shaped cross-section. The thickness of the thick portion 5c decreases gradually towards the end of the thick portion 5c in the width direction. Accordingly, the thick portion 5c is connected with the thin portions 5a and 5b smoothly.

The thickness of the thin portions 5a and 5b is, for example, 0.001 to 0.5 mm, and is specifically for example, 0.001, 0.01, 0.1, 0.2, 0.3, 0.4, or 0.5, and can be in the range between the two values exemplified herein. The thickness of the thickest portion of the thick portion 5c is 0.1 to 3 mm, and is specifically for example, 0.1, 0.5, 1, 1.5, 2, or 3 mm, and can be in the range between the two values exemplified herein.

Figure 7A:
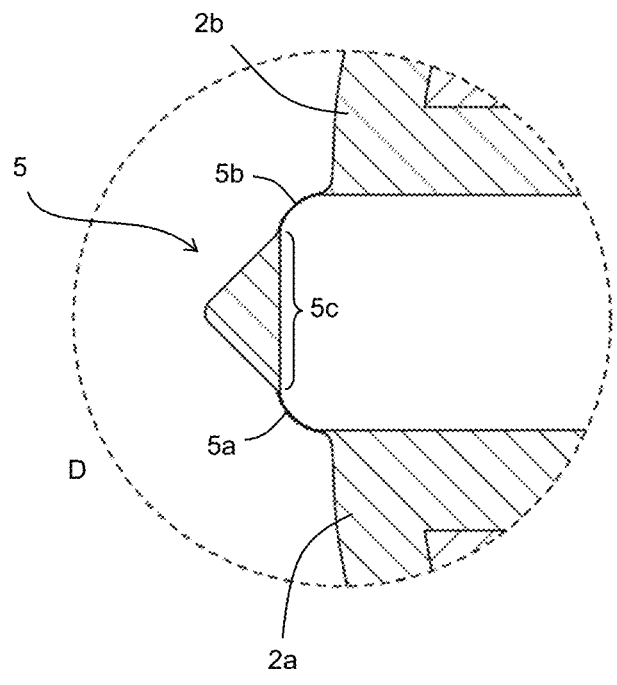
FIG. 7A shows an enlarged view of region D in FIG. 6, in a condition where the thin portions 5a and 5b are bent evenly.

The thickness of the thin portions 5a and 5b is smaller than the thickness of the thick portion 5c. Therefore, when the main body portions 2a and 2b are bent at the hinge portion 5, as shown in FIG. 7A, the thin portions 5a and 5b tend to be bent selectively. The width of the thin portions 5a and 5b are smaller than the entirety of the hinge portion 5. Therefore, even when the folded line formed in the thin portions 5a and 5b is meandered, it would not be prominent. Thus, according to the present embodiment, deterioration of the external appearance due to meander of the folded line formed in the hinge portion 5 is suppressed.

Figure 14:
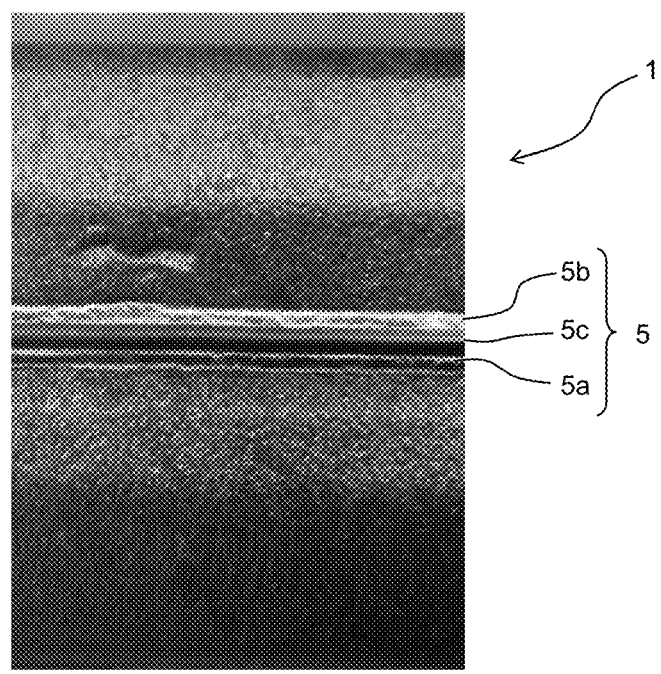
FIG. 14 shows a picture of a resin molded body 1 having glass fibers aligned in a direction orthogonal with the longitudinal direction of the hinge portion 5, the width of each of the thin portions 5a and 5b being 1 mm, the width of the thick portion 5c being 2 mm, wherein the resin molded body 1 is being bent at the hinge portion 5.
Figure 15A:
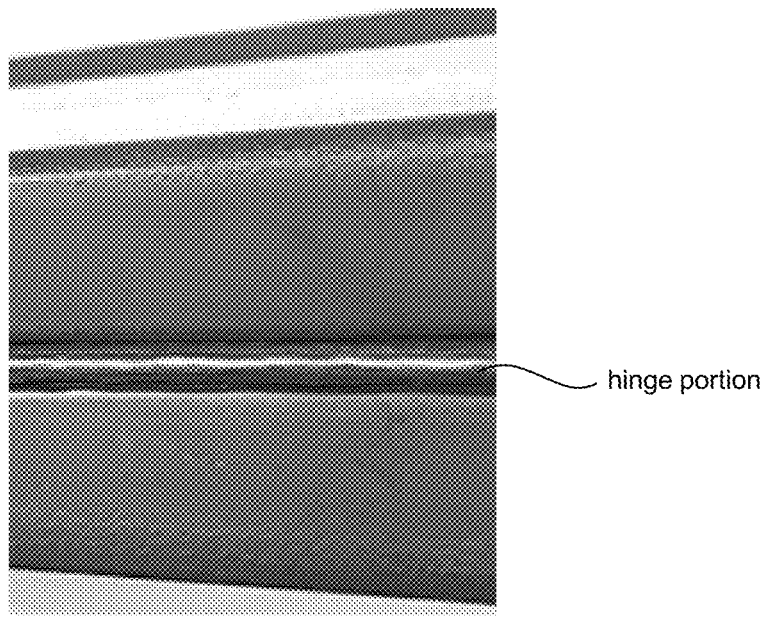
FIG. 15A shows a picture of a resin molded body containing no inorganic fiber, the width of the hinge portion being 4 mm, wherein the resin molded body is being bent at the hinge portion.
Figure 15B:
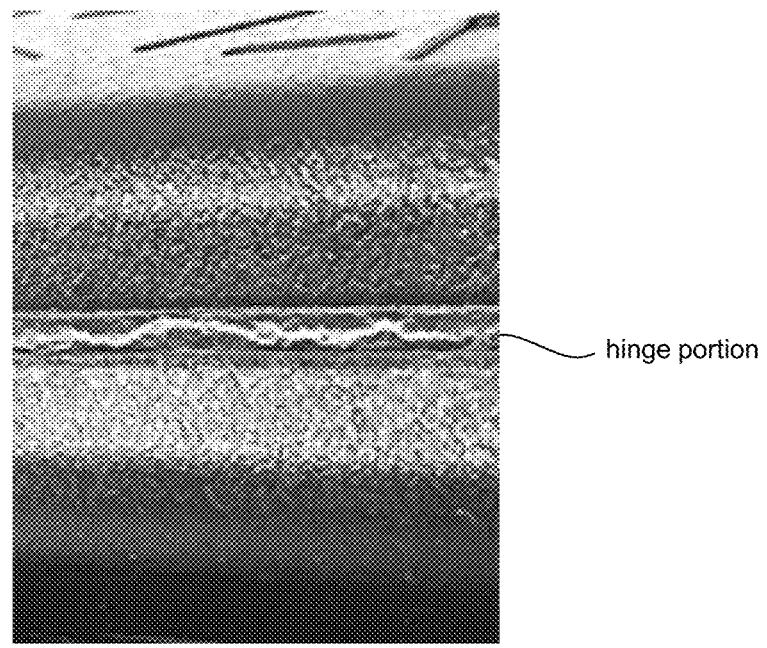
FIG. 15B shows a picture of a resin molded body having glass fiber aligned in a direction orthogonal with the longitudinal direction of the hinge portion, the width of the hinge portion being 4 mm, wherein the resin molded body is being bent at the hinge portion.

For example, in the conventional technique, where the width of the entirety of the hinge portion 5 is 4 mm and the thickness of the hinge portion 5 is uniform, the folded line would meander throughout the width of 4 mm, resulting in large amplitude. Accordingly, as shown in FIG. 15B, the meander of the folded line would be prominent. On the other hand, in the present embodiment having a constitution in which the thick portion 5c is sandwiched by the thin portions 5a and 5b, the width of each of the thin portions 5a and 5b being 1 mm and the width of the thick portion 5c being 2 mm, the folded line would be formed in each of the thin portions 5a and 5b. Therefore, the meandering range of each of the folded line would be restricted within 1 mm. Accordingly, the amplitude of the meander would be reduced largely compared with the conventional technique, and thus the meander of the folded line would not be prominent as shown in FIG. 14. Therefore, deterioration of external appearance due to meander of the folded line would be suppressed.

Figure 7B:
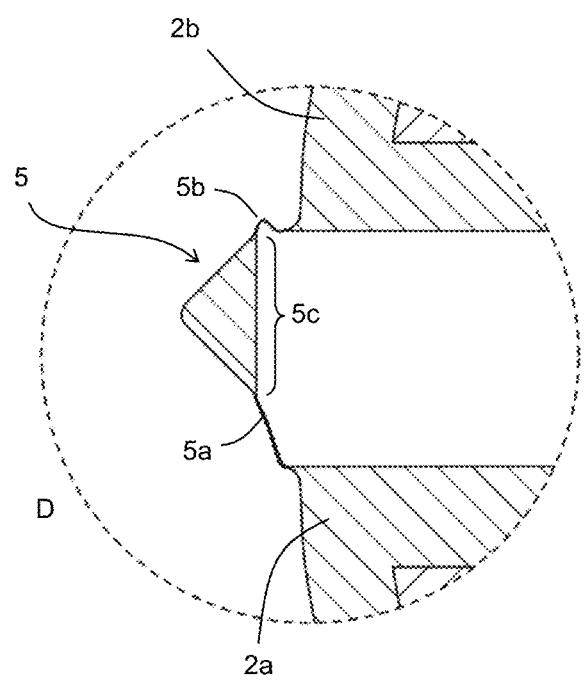
FIG. 7B shows an enlarged view of region D in FIG. 6, in a condition where the thin portions 5a and 5b are bent unevenly.

Here, when the main body portions 2a and 2b are bent at the hinge portion 5, the thin portions 5a and 5b are not always bent uniformly, and the thin portions 5a and 5b can be bent ununiformly as shown in FIG. 7B. In the case shown in FIG. 7B, the radius of curvature of the thin portion 5b is significantly smaller than the radius of curvature of the thin portion 5a. In such case, cracks easily occur at the thin portion 5b, which can be problematic.

Figure 5:
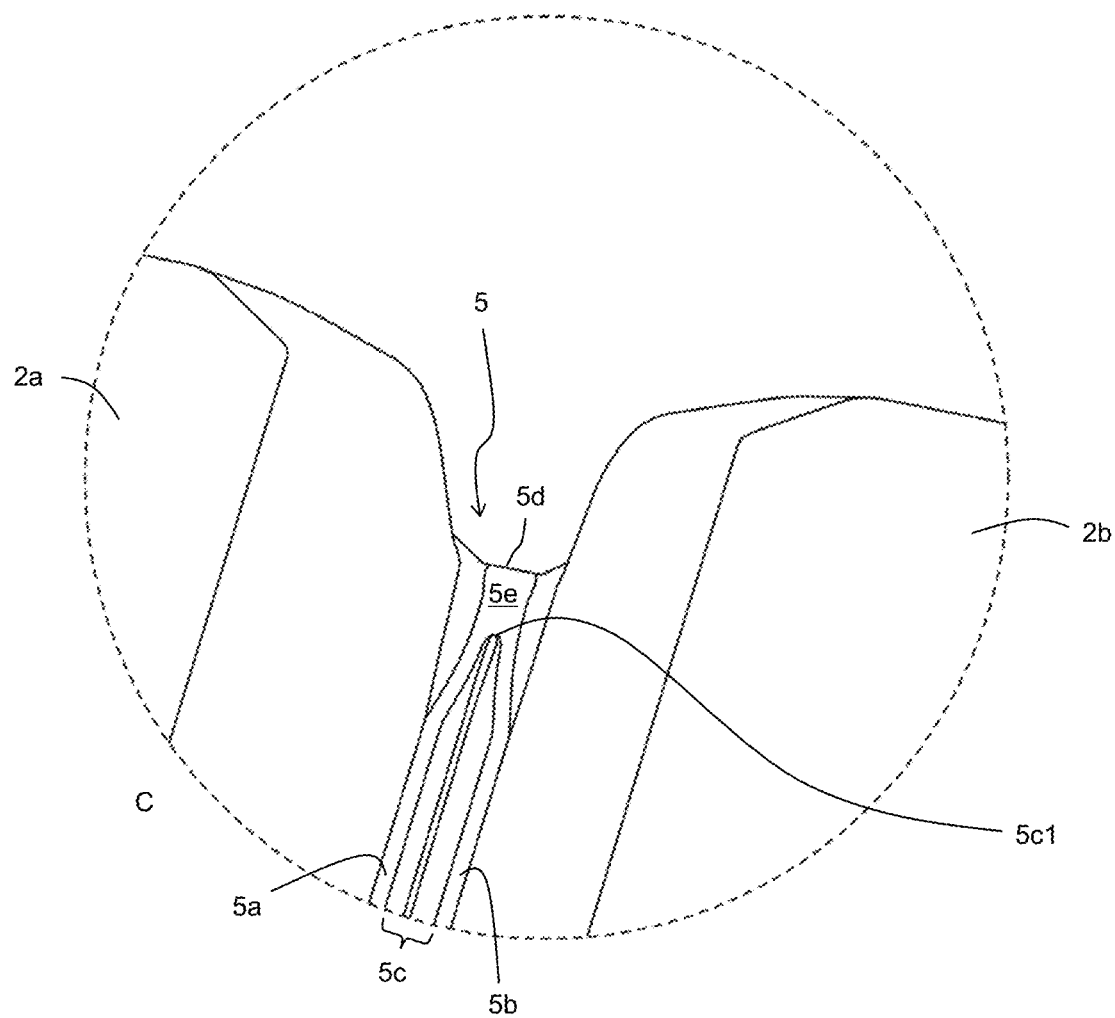
FIG. 5 shows an enlarged view of region C in FIG. 3.
Figure 6:
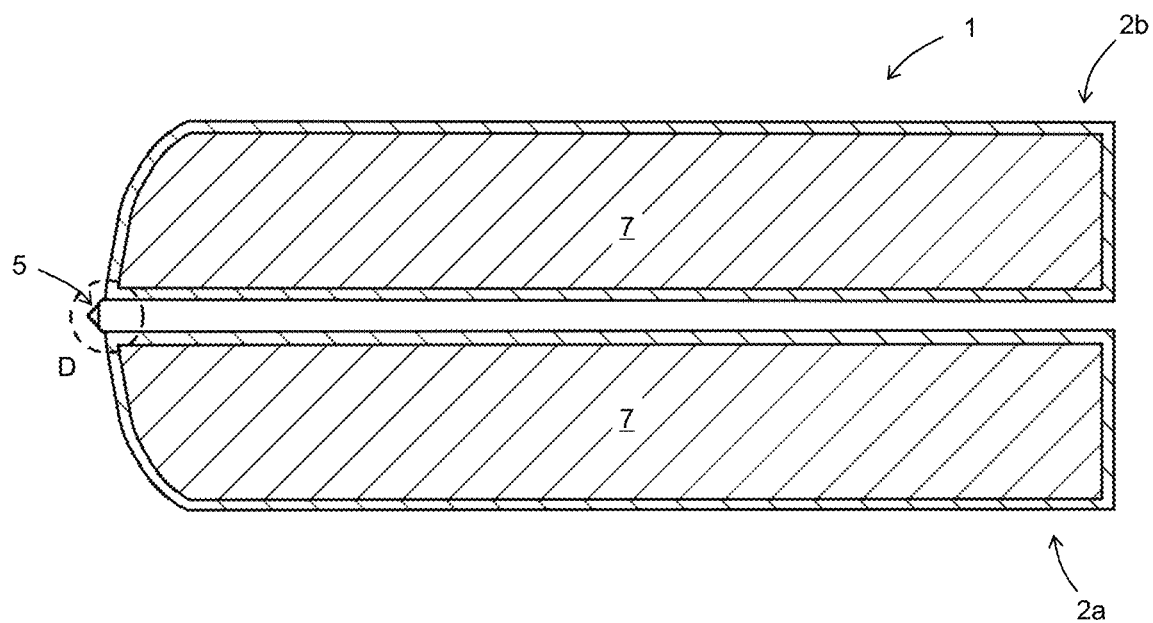
FIG. 6 shows a cross-sectional view of the same cross-section as FIG. 3, in a condition where the main body portions 2a and 2b are bent at the hinge portion 5.
Figure 8:
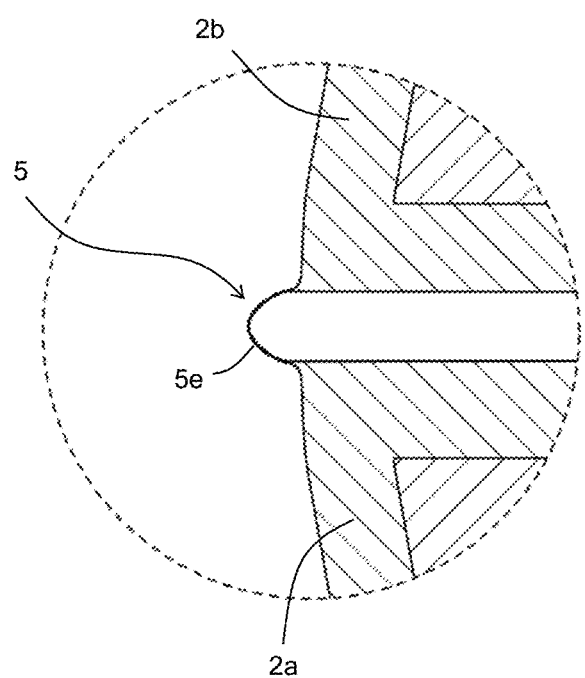
FIG. 8 shows an enlarged view of a cross-section of a vicinity of the hinge portion 5 crossing the thin portion 5e, at a vicinity of the end portion 5d in the longitudinal direction of the hinge portion 5.

In order to prevent such cracks, in the present embodiment, as shown in FIG. 2 and FIG. 5, the thick portion 5c is provided so as not to reach the end portion 5d of the hinge portion 5 in the longitudinal direction. Accordingly, the thick portion 5c do not exist in the vicinity of the end portion 5d, and only one thin portion Se is provided. When the main body portions 2a and 2b are bent at the hinge portion 5, they would provide a condition shown in FIG. 8. Since cracks of the thin portion tend to occur at the end portion 5d, by preventing the thin portion from being divided by the thick portion at the end portion 5d, occurrence of cracks at the thin portion can be suppressed.

On the other hand, when the thick portion is not provided in the vicinity of the end portion 5d, the meander of the folded line in the vicinity of the end portion 5d would become prominent, which can be problematic. Accordingly, in order to alleviate the influence of such problem, in the present embodiment, as shown in FIG. 2 and FIG. 5, the width of the hinge portion 5 decreases towards the end portion 5d in the vicinity of the end portion 5d. Here, when the width of the hinge portion 5 is made small in the vicinity of the end portion 5d, the meander would be less prominent, however, the radius of curvature when bent at the hinge portion 5 would become small, thereby raising the possibility of cracks at the hinge portion 5. When secure prevention of cracks at the hinge portion 5 is given priority, it is preferable not to make the width of the hinge portion 5 small in the vicinity of the end portion 5d. For example, as shown in FIG. 20, the width of the hinge portion 5 is made the same as the width of the entirety of the hinge portion 5 at the portion where the thick portion 5c is provided, even in the vicinity of the end portion 5d.

When the width of the hinge portion 5 at the portion in which the width of the hinge portion 5 is constant (herein after referred to as "constant width portion") is taken as Wh, and the width of the hinge portion 5 at the end portion 5d is taken as We, relation of We/Wh=0.2 to 0.8 is preferably satisfied. When this value is too large, the meander of the folded line tends to become prominent. When this value it too small, it becomes difficult to bend at the hinge portion 5. The value of We/Wh is, specifically for example, 0.2, 0.3, 0.4, 0.5, 0.6, 0.7, or 0.8, and can be in the range between the two values exemplified herein.

In addition, when the width of the thick portion 5c at the constant width portion is taken as Wc, relation of Wc/Wh=0.2 to 0.8 is preferably satisfied. When this value is too large, the width of the thin portions 5a and 5b would be too small, and thus it becomes difficult to bend at the hinge portion 5. When this value is too small, the width of the thin portions 5a and 5b would be too large, and thus the meander of the folded line tends to become prominent. The value of Wc/Wh is, specifically for example, 0.2, 0.3, 0.4, 0.5, 0.6, 0.7, or 0.8, and can be in the range between the two values exemplified herein.

Wh is, for example, 2 to 10 mm, preferably 3 to 6 mm. When this value is too large, the hinge portion 5 would become too prominent, thereby deteriorating the external appearance. When this value is too small, it becomes difficult to bend at the hinge portion 5. Wh is, specifically for example, 2, 3, 4, 5, 6, 7, 8, 9, or 10 mm, and can be in the range between the two values exemplified herein.

The distance L from the end portion 5d to the constant width portion is, for example, 5 to 30 mm, and is specifically for example, 5, 10, 15, 20, 25, or 30 mm, and can be in the range between the two values exemplified herein. When this value is too large, the meander of the folded line tends to become prominent. When this value is too small, it becomes difficult to bend at the hinge portion 5. The distance Lc from the end portion 5d from the end portion 5c1 of the thick portion in the longitudinal direction is, for example, 3 to 15 mm, specifically for example, 3, 4, 5, 6, 7, 8, 9, 10, 11, 12, 13, 14, or 15 mm, and can be in the range between the two values exemplified herein. When this value is too large, the meander of the folded line tends to become prominent. When this value is too small, cracks of the hinge portion 5 tend to occur at the end portion 5d.

At least one of the thickness or the width of the thick portion 5c becomes gradually smaller towards the end portion 5d in the vicinity of the end portion 5c1 in the longitudinal direction of the thick portion 5c. With such constitution, the thick portion 5c fades smoothly at the vicinity of the end portion 5d.

The length of the section (gradually changing section) V in which at least one of the thickness or the width of the thick portion 5c becomes gradually smaller is, for example, 3 to 25 mm, and is specifically for example, 3, 5, 10, 15, 20, or 25 mm, and can be in the range between the two values exemplified herein. When this value is too large, the meander of the folded line tends to become prominent. When this value is too small, cracks tend to occur at the boundary of the thick portion 5c and the thin portion 5e.

The resin molded body 1 preferably contains inorganic fiber. In addition, the inorganic fiber is preferably orientated in a direction not parallel with the longitudinal direction of the hinge portion 5, and is further preferably orientated in a direction orthogonal with the longitudinal direction of the hinge portion 5. The meander of the folded line is especially prominent in such case, and thus technical significance of adopting the constitution of the present invention is especially large. As the inorganic fiber, glass fiber and carbon fiber can be mentioned. The phrase "inorganic fiber is orientated" refers to a condition in which a plurality of inorganic fiber are oriented in approximately the same direction. For example, when the resin molded body 1 is formed by using a resin sheet formed by extruding a molten resin containing the inorganic fiber, a plurality of inorganic fiber would be orientated approximately in the extrusion direction of the resin sheet. Accordingly, the extrusion direction of the resin sheet would be the orientation direction of the inorganic fiber. Content of inorganic fiber in the resin molded body 1 is preferably 1 to 40 mass %, more preferably 5 to 30 mass %, and further preferably 10 to 25 mass %. The content is, specifically for example, 1, 5, 10, 15, 20, 25, 30, 35, or 40 mass %, and can be in the range between the two values exemplified herein. When the content is too small, rigidity of the resin molded body 1 would be insufficient, and when the content is too large, the moldability of the resin molded body 1 would deteriorate and the resin molded body 1 would be cracked easily.

1-2. Molding Machine 10

Next, referring to FIG. 9 and FIG. 10, the molding machine 10 which can be used in implementation of the manufacturing method of the structure body according to the first embodiment of the present invention will be explained. The molding machine 10 comprises a pair of resin sheet forming machine 20, and a first and second molds 21 and 31. Each of the resin sheet forming machine 20 comprises a hopper 12, an extruder 13, an accumulator 17, and a T-die 18. The extruder 13 and the accumulator 17 are connected via a connecting tube 25. The accumulator 17 and the T-die 18 are connected via a connecting tube 27.

Hereinafter, each of the constitution will be explained in detail.

<Hopper 12, Extruder 13>

The hopper 12 is used for charging a raw material resin 11 into the cylinder 13a of the extruder 13. The form of the raw material resin 11 is not particularly limited, however, it is usually in a pellet form. The raw material resin is a thermoplastic resin such as polyolefin for example. As the polyolefin, low density polyethylene, straight chain low density polyethylene, high density polyethylene, polypropylene, ethylene-propylene copolymer, and mixtures thereof can be mentioned. The raw material resin 11 is charged into the cylinder 13a from the hopper 12, and is heated in the cylinder 13a, thereby being melt to a molten resin. Then, by the rotation of the screw arranged in the cylinder 13a, the molten resin is transferred towards the tip of the cylinder 13a. The screw is arranged in the cylinder 13a, and its rotation kneads and transfers the molten resin. At the rear anchor of the screw, a gear device is provided, and the screw is rotated by the gear device.

When the inorganic fiber is contained in the resin sheets 23 and 33, the inorganic fiber is preferably contained in the raw material resin.

<Accumulator 17, T-Die 18>

The molten resin is extruded from the resin extruding outlet of the cylinder 13a, and is injected into the accumulator 17 via the connecting tube 25. The accumulator 17 is provided with a cylinder 17a and a piston 17b which is slidable within the cylinder 17a. The molten resin can be stored in the cylinder 17a. By moving the piston 17b after a predetermined amount of the molten resin is stored in the cylinder 17a, the molten resin is extruded from the slit provided in the T-die 18 via the connecting tube 27, thereby forming the first and second resin sheets 23 and 33 in a molten condition. When the inorganic fiber is contained in the raw material resin the inorganic fiber is orientated in the extrusion direction of the resin sheets 23 and 33.

<Molds 21 and 31>

The resin sheets 23 and 33 are extruded in between the molds 21 and 31. As shown in FIG. 10, the molds 21 and 31 have cavities 21a and 31a, and pinch off portions 21b and 31b are provided so as to surround the cavities 21a and 31a, respectively. In the cavities 21a and 31a, reduced pressure suction holes (not shown) are provided, and the resin sheets 23 and 33 are suctioned by reduced pressure via the reduced pressure suction holes, thereby being shaped into a shape following the inner surface of the cavities 21a and 31a of the molds 21 and 31. The reduced pressure suction holes are minute holes, and one end thereof is communicated with the inner surface of the cavities 21a and 31a by penetrating through the molds 21 and 31, and the other end thereof is connected to the pressure reducing device.

The mold 31 is provided with a protrusion 31c for forming the hinge portion 5. The protrusion 31c is an elongated protrusion, and the longitudinal direction of the protrusion 31c is preferably not parallel with the extrusion direction of the resin sheets 23 and 33. The longitudinal direction of the protrusion 31c is preferably orthogonal with the extrusion direction of the resin sheets 23 and 33. In such case, the change in the thickness of the resin sheets 23 and 33 along the longitudinal direction of the hinge portion 5 is suppressed. As shown in FIG. 10, at the tip of the protrusion 31c, a tip surface 31c1 corresponding to the thin portions 5a and 5b, and a groove 31c2 corresponding to the thick portion 5c are provided.

1-3. Manufacturing Method of Structure Body

Here, referring to FIG. 9 to FIG. 13, the manufacturing method of the structure body according to the first embodiment of the present invention will be explained. The method of the present embodiment comprises an extruding step, a shaping step, an inserting step, and a clamping step. Hereinafter, detailed explanation will be provided.

(1) Extruding Step

Figure 9:
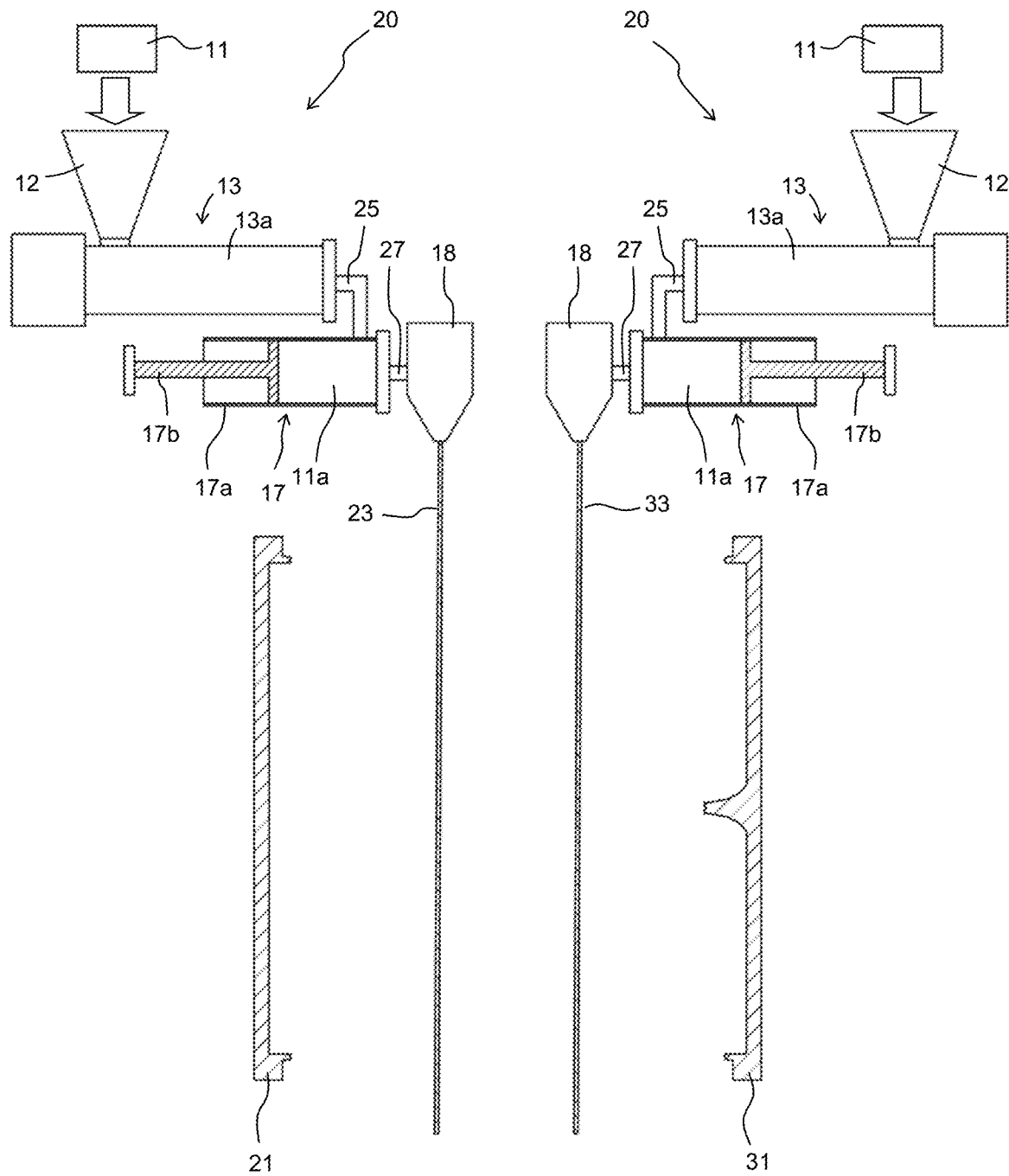
FIG. 9 shows a structural diagram (a longitudinal cross-sectional view with respect to molds 21 and 31, and components in the vicinity thereof) of a molding machine 10 which can be used for manufacturing a structure body according to the first embodiment of the present invention.
Figure 10:
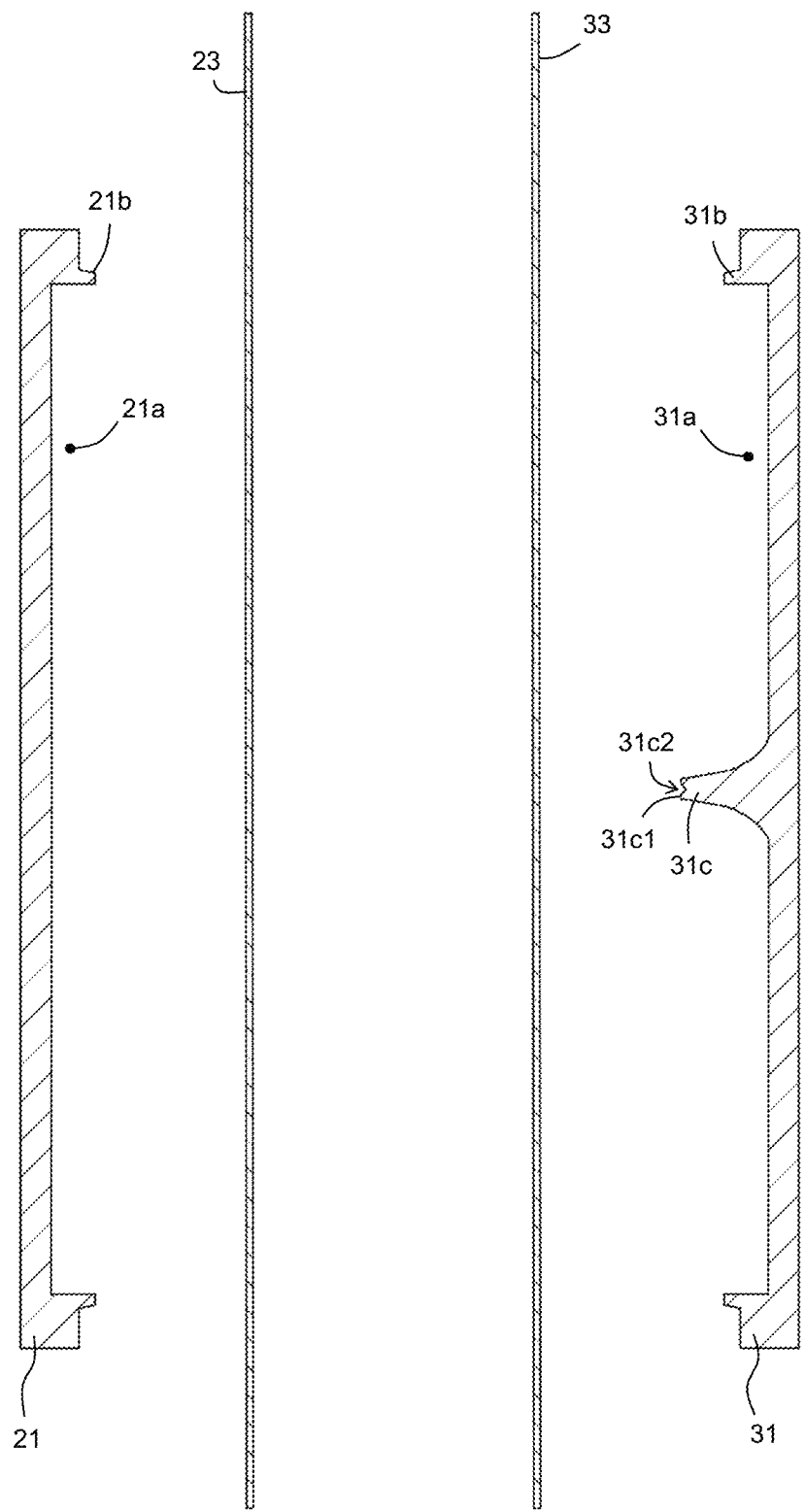
FIG. 10 shows a cross-sectional view in which resin sheets 23 and 33 are extruded in between the molds 21 and 31.

In the extruding step, as shown in FIG. 9 and FIG. 10, the resin sheets 23 and 33 are extruded in between the molds 21 and 31.

(2) Shaping Step

Figure 11:
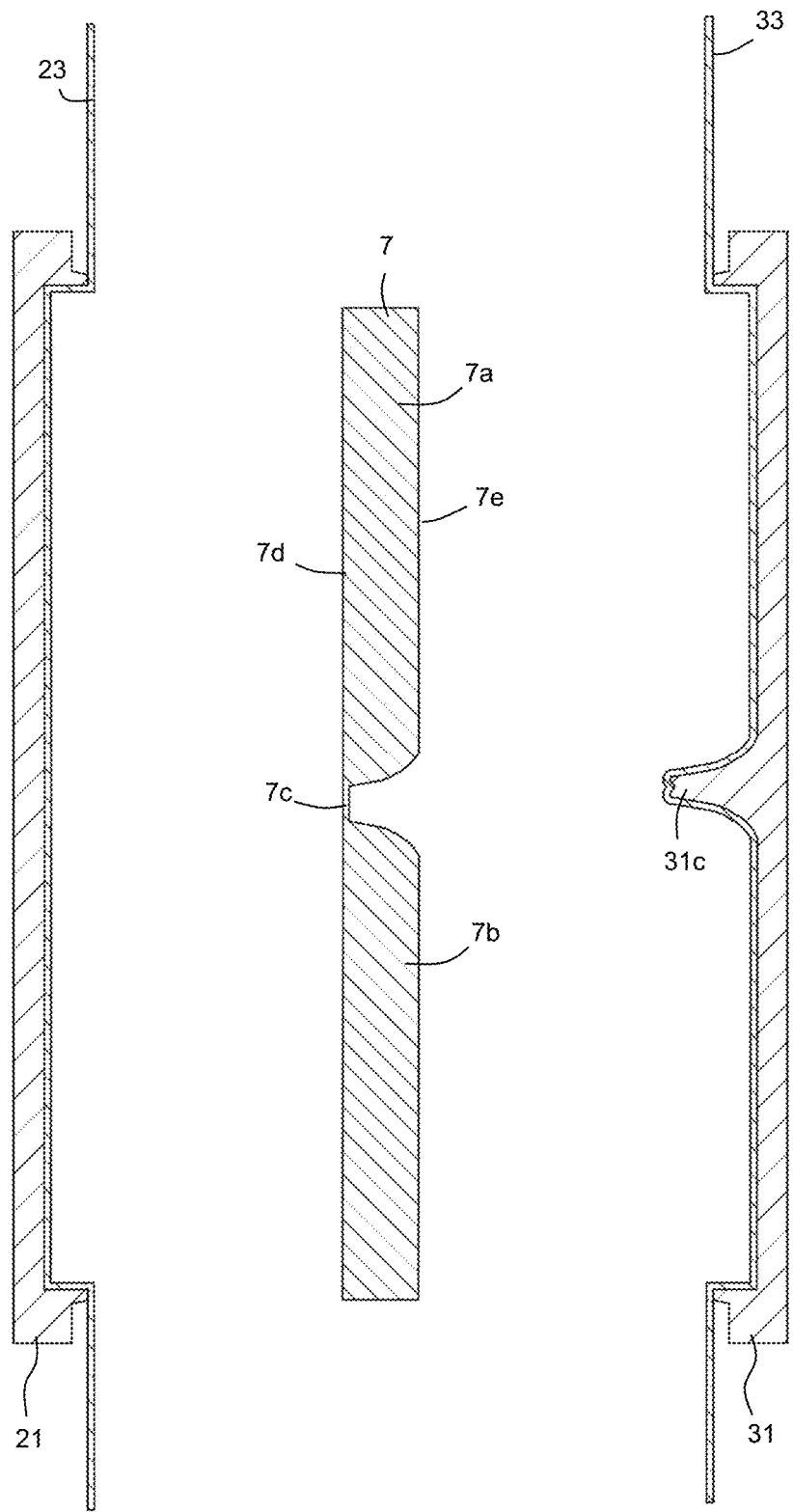
FIG. 11 shows a cross-sectional view in which the resin sheets 23 and 33 are shaped along the inner surface of the cavity of molds 21 and 31, from the condition shown in FIG. 10.

In the shaping step, as shown in FIG. 10 and FIG. 11, the resin sheets 23 and 33 are subjected to reduced pressure suction by the molds 21 and 31, thereby shaping the resin sheets 23 and 33 into a shape following the inner surface of the cavities 21a and 31a. In the present embodiment, other component such as outer surface material is not arranged in between the resin sheet 23 and the mold 21, and in between the resin sheet 33 and the mold 31. Accordingly, each of the resin sheets 23 and 33 is shaped so as to come directly into contact with the molds 21 and 31, respectively. Here, the outer surface material can be integrally molded on the resin sheet 23 side. In such case, the resin sheet 23 is shaped in a condition where the outer surface material is arranged in between the mold 21 and the resin sheet 23.

(3) Inserting Step

Figure 12:
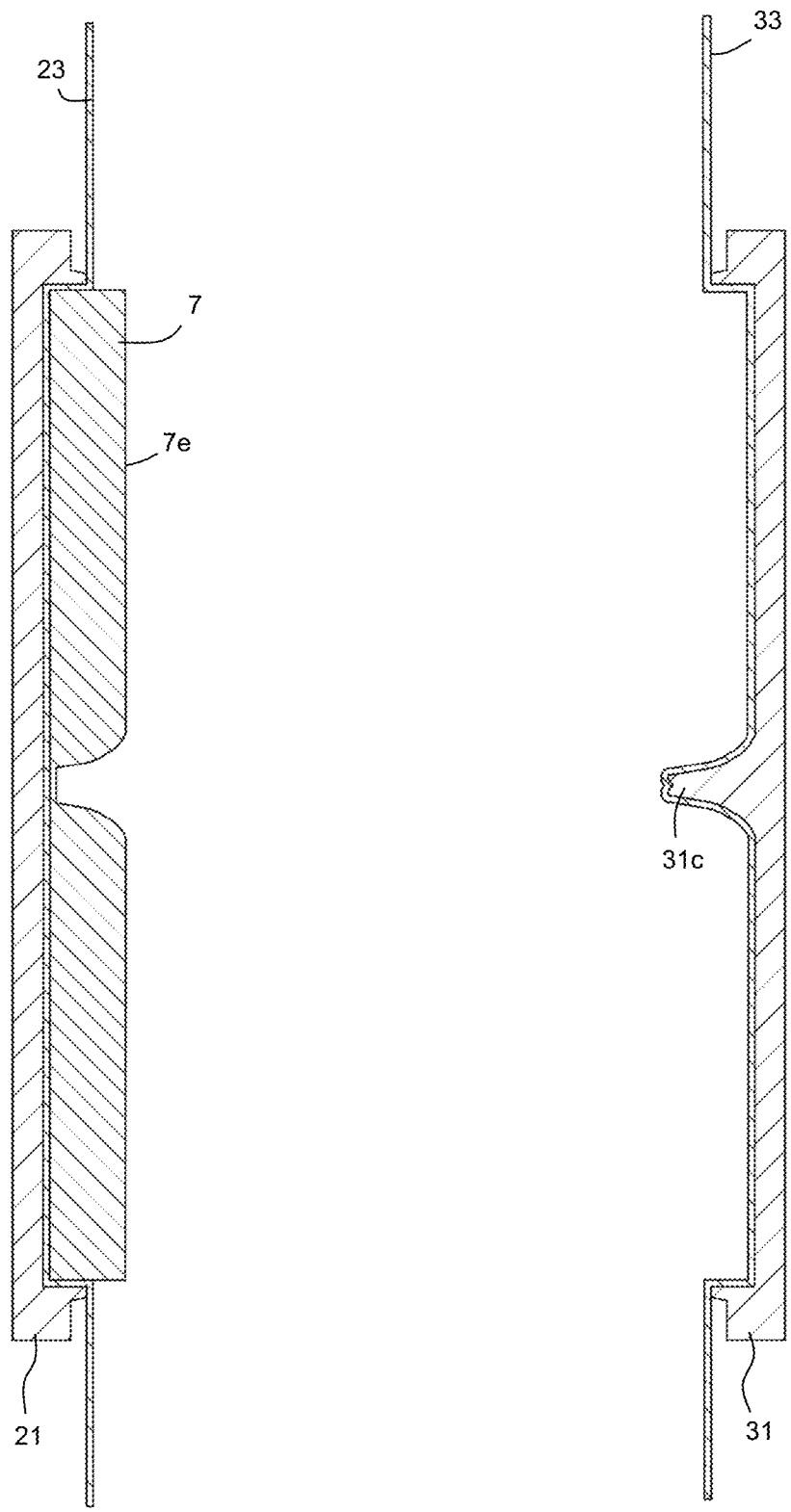
FIG. 12 shows a cross-sectional view in which an insert component 7 is adhered onto the resin sheet 23 from the condition shown in FIG. 11.
Figure 13:
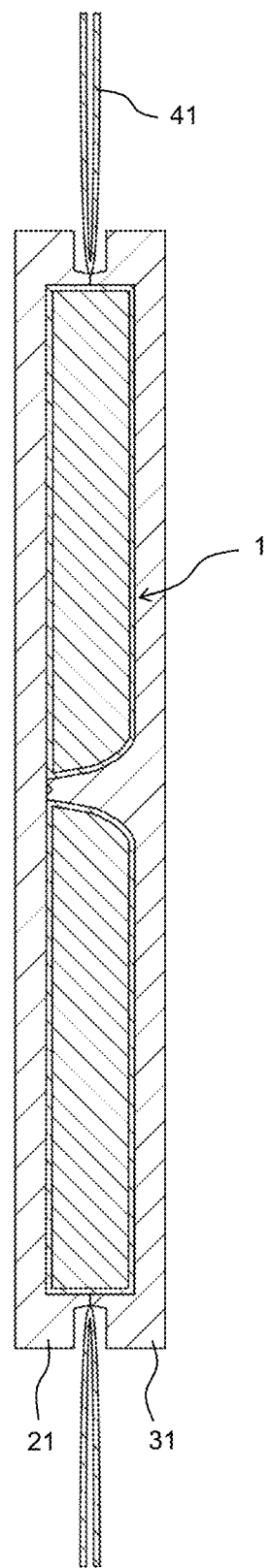
FIG. 13 shows a cross-sectional view in which the molds 21 and 31 are clamped from the condition shown in FIG. 12.

In the inserting step, as shown in FIG. 11 and FIG. 12, the insert component 7 is welded on the resin sheet 23. When the insert component 7 is constituted with a foam body, the foam body melts by the heat of the resin sheet 23, and thus one surface 7d of the insert component 7 is welded on the resin sheet 23. The other surface 7e of the insert component 7 is welded on the resin sheet 33 when clamping shown in FIG. 13 is performed. The insert component 7 is constituted by connecting the first and second main body portions 7a and 7b with the connecting portion 7c. The main body portions 7a and 7b are each housed in the main body portions 2a and 2b of the resin molded body 1, respectively. The connecting portion 7c corresponds to the hinge portion 5. The connecting portion 7c can be omitted, and in such case, two insert components corresponding to each of the main body portions 7a and 7b can be inserted.

(4) Clamping Step

In the clamping step, as shown in FIG. 12 and FIG. 13, the molds 21 and 31 are subjected to clamping. Accordingly, the resin sheets 23 and 33 are welded with each other along the pinch off portions 21b and 31b, thereby obtaining a resin molded body 1 having a shape following the inner surface of the cavity formed by a pair of molds 21 and 31. In between the protrusion 31c and the mold 21, the resin sheets 23 and 33 and the connecting portion 7c are compressed to form the hinge portion 5. The portion compressed by the tip surface 31c1 of the protrusion 31c would be the thin portions 5a and 5b, and the portion facing the groove 31c2 would be the thick portion 5c. The outer side of the pinch off portions 21b and 31b would be burr 41. Thereafter, the molds 21 and 31 are opened to take out the resin molded body 1, followed by removal of the burr 41, thereby obtaining the structure body having the resin molded body 1 shown in FIG. 1. The tip surface 31c1 can be a planar surface of a curved surface.

2. Second Embodiment

The second embodiment of the present invention will be explained with reference to FIG. 16 to FIG. 19. The present embodiment is similar to the first embodiment, and the major difference is that the structure body 100 is constituted with the resin molded body 1 and the outer surface material 8. Hereinafter, such difference will be mainly explained.

The hinge portion 5 is formed by denting the back wall 4 side of the resin molded body 1. The thick portion 5c is protruded towards the back wall 4 side, thereby allowing to have a larger thickness than the thin portions 5a and 5b. The hinge portion 5 has a flat surface at the front wall 3 side. At the front wall 3 side of the resin molded body 1, a flat surface is provided so as to extend over the main body portion 2a, the hinge portion 5, and the main body portion 2b.

The outer surface material 8 is provided on the front wall 3 side of the resin molded body 1, so as to extend over the main body portion 2a, the hinge portion 5, and the main body portion 2b. The outer surface material 8 is preferably constituted with a carpet-like component having air permeability like a non-woven cloth, and is preferably integrally molded with the resin molded body 1 when the resin molded body 1 is molded. Accordingly, the structure body 100 having the resin molded body 1 and the outer surface material molded integrally is obtained.

Figure 17A:
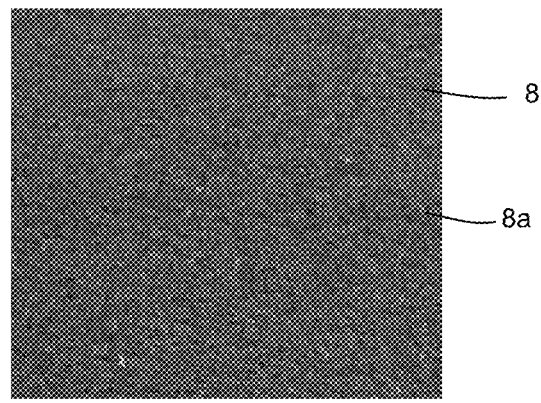
FIG. 17A shows a picture in which the structure body 100 according to the present embodiment is observed from the outer surface material 8 side.
Figure 17B:
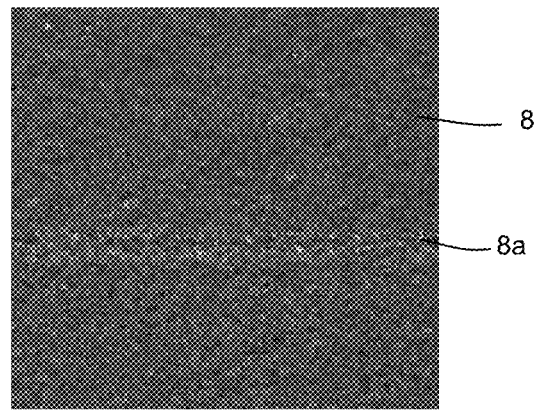
FIG. 17B shows a picture in which a conventional structure body 100 is observed from the outer surface material 8 side.

Here, as in the present embodiment, when the hinge portion 5 is constituted with the thin portions 5a and 5b, and with the thick portion 5c between thereof, as shown in FIG. 17A, the external appearance of the portion 8a which face the hinge portion 5 hardly differs from the other portions of the outer surface material 8. On the other hand, in the conventional case where the hinge portion 5 is constituted with only the thin portion, as shown in FIG. 17B, the portion 8a which face the hinge portion 5 shines, thereby deteriorating the external appearance of the outer surface material 8.

As described, according to the present embodiment, an effect of improving the external appearance of the portion 8a which face the hinge portion 5 can be achieved.

The principle of achieving such effect with be explained with reference to FIG. 18A to FIG. 18D and FIG. 19A to FIG. 19D. FIG. 18A to FIG. 18D are related to the present embodiment in which the tip surface 31c1 and the groove 31c2 are provided on the tip of the protrusion 31c of the mold 31, and FIG. 19A to FIG. 19D are related to a conventional technique in which the groove 31c2 is not provided. Here, a case where the outer surface material 8 is a carpet-like component like a non-woven cloth is explained for example.

Figure 19A:
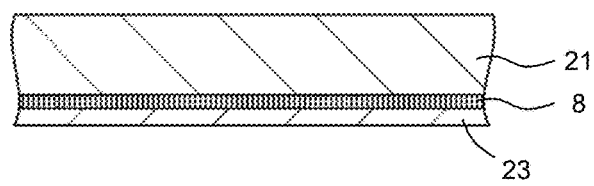
FIG. 19A to FIG. 19D show a cross-sectional view of the manufacturing process of a conventional structure body 100.

FIG. 18A and FIG. 19A correspond to the condition shown in FIG. 11. The resin sheet 23 is shaped along the inner surface of the cavity of the mold 21 in a condition where the outer surface material 8 is arranged in between the mold 21 and the resin sheet 23. As shown in FIG. 18A and FIG. 19A, in a condition where the molds 21 and 31 are spaced, the outer surface material 8 is not compressed.

Figure 19B:
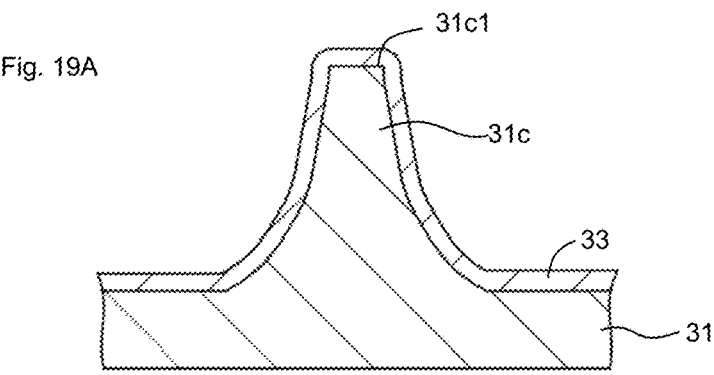

As shown in FIG. 18B and FIG. 19B, when the molds 21 and 31 are closed, the tip surface 31c1 of the protrusion 31c of the mold 31 comes substantially in contact with the inner surface of the mold 21. In this condition, the entirety of the outer surface material 8 is compressed, and the portion sandwiched by the tip surface 31c1 of the protrusion 31c and the mold 21 is especially strongly compressed. In addition, in this portion, the resin of the resin sheets 23 and 33 are also compressed, and are impregnated into the outer surface material 8. As shown in FIG. 18B, when there is a groove 31c2 at the tip of the protrusion 31c, the outer surface material 8 is hardly compressed at the portion facing the groove 31c2, and the resin is hardly impregnated into the outer surface material 8.

Figure 19C:
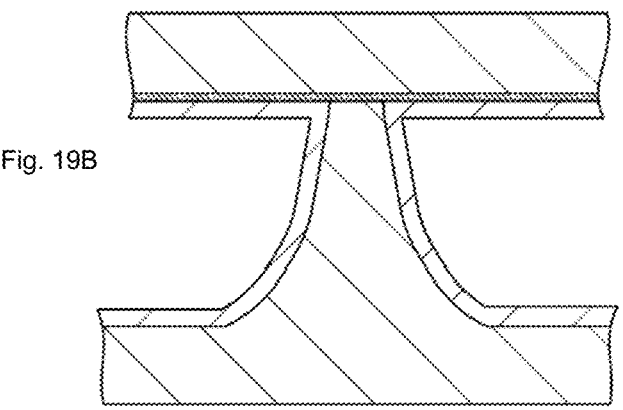
Figure 19D:
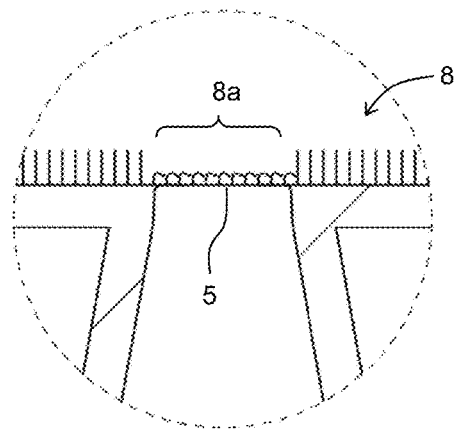

The structure body 100 taken out from the molds 21 and 31 after cooling the resin is shown in FIG. 18C and FIG. 18D, and in FIG. 19C and FIG. 19D. In both structure body 100, the outer surface material 8 at the portion other than the hinge portion 5 is returned to an uncompressed condition.

In the conventional structure body 100 shown in FIG. 19D, the outer surface material 8 is kept compressed in the entirety of the portion 8a facing the hinge portion 5. The reason for such phenomena is that since the molten resin is impregnated into the entirety of the portion 8a, the molten resin would solidify in such condition. In addition, since the outer surface material 8 is compressed in such a large area, in the conventional structure body 100, as shown in FIG. 17B, the portion 8a shines, thereby deteriorating the external appearance.

On the other hand, in the structure body 100 according to the present embodiment shown in FIG. 18D, the portion facing the thin portions 5a and 5b among the portion 8a facing the hinge portion 5 are kept compressed as in the case of the conventional structure body 100, however, the portion facing the thick portion 5c has low degree of compression of the outer surface material 8 and a low degree of resin impregnation, and thus when the structure body 100 is taken out of the molds 21 and 31, the outer surface material 8 would substantially recover its original condition. Accordingly, in the structure body 100 according to the present embodiment, the region in which the outer surface material 8 is compressed would have a smaller width compared with the case of the conventional structure body 100, and thus the portion 8a would be less prominent as shown in FIG. 17A.

3. Other Embodiment

The insert component 7 can be omitted.
The resin molded body 1 can be constituted with one foam resin sheet or non-foam resin sheet.

EXPLANATION OF SYMBOLS

1: resin molded body, 2a: first main body portion, 2b: second main body portion, 3: front wall, 4: back wall, 5: hinge portion, 5a: first thin portion, 5b: second thin portion, 5c: thick portion, 5c1: end portion, 5d: end portion, 5e: thin portion, 6: surrounding wall, 7: insert component, 7a: first main body portion, 7b: second main body portion, 7c: connecting portion, 7d: one surface, 7e: other surface, 8: outer surface material, 8a: portion, 10: molding machine, 11: raw material resin, 12: hopper, 13: extruder, 13a: cylinder, 17: accumulator, 17a: cylinder, 17b: piston, 18: T-die, 20: resin sheet forming machine, 21: first mold, 21a: cavity, 21b: pinch off portion, 23: first resin sheet, 25: connecting tube, 27: connecting tube, 31: second mold, 31a: cavity, 31b: pinch off portion, 31c: protrusion, 33: second resin sheet, 41: burr, 100: structure body

The invention claimed is:

1. A structure body having a resin body, the resin body comprising:
   a first main body portion, a second main body portion, and a hinge portion
   wherein
   the first main body portion and the second main body portion are connected at the hinge portion with each other so as to be rotatable with respect to each other, the first main body portion and the second main body portion comprising a front wall and a back wall facing each other with a gap, and a surrounding wall connecting surroundings of the front wall and the back wall, wherein
   the hinge portion comprises a first thin portion, a second thin portion, and a thick portion, wherein the thick portion is a portion being larger in wall thickness than the first thin portion and the second thin portion;
   the first thin portion, the second thin portion, and the thick portion elongate in a longitudinal direction of the hinge portion;
   the thick portion is sandwiched by the first thin portion and the second thin portion in a width direction of the hinge portion; and
   a wall thicknesses of the first thin portion, the second thin portion, and the thick portion are each smaller than a sum of wall thickness of the front wall and the back wall.

2. The structure body of claim 1, wherein at least one of thickness or width of the thick portion becomes gradually smaller towards the end portion of the hinge portion in the longitudinal direction in a vicinity of an end portion in a longitudinal direction of the thick portion.

3. The structure body of claim 1, wherein when a width of the hinge portion at a portion in which the width of the hinge portion is constant and a width of the thick portion at the portion in which the width of the hinge portion is constant are taken as Wh and Wc, respectively, relation of Wc/Wh=0.2 to 0.8 is satisfied.

4. The structure body of claim 1,
   wherein a thickness of the thick portion decreases gradually towards an end of a width direction of the thick portion.

5. The structure body of claim 1, wherein the resin body contains inorganic fiber; and
   the inorganic fiber is orientated in a direction not parallel with a longitudinal direction of the hinge portion.

6. The structure body of claim 1, wherein
   a thickness of the first and second thin portions is 0.001 to 0.5 mm.

7. The structure body of claim 6, wherein
   a thickness of a thickest portion of the thick portion is 0.1 to 0.3 mm.

8. The structure body of claim 1, wherein
   when a width of the hinge portion at a portion in which the width of the hinge portion is constant is taken as Wh, Wh is 3 to 6 mm.

9. The structure body of claim 2, wherein
   the thickness of the thick portion becomes gradually smaller towards the end portion of the hinge portion in the longitudinal direction in a vicinity of an end portion in a longitudinal direction of the thick portion.

10. The structure body of claim 2, wherein
    the width of the thick portion becomes gradually smaller towards the end portion of the hinge portion in the longitudinal direction in a vicinity of an end portion in a longitudinal direction of the thick portion.

11. The structure body of claim 1, wherein a width of the hinge portion decreases from the thick portion towards the end portion of the hinge portion in the longitudinal direction of the hinge portion, in a vicinity of the hinge portion in the longitudinal direction of the hinge portion.

12. The structure body of claim 1, wherein the thick portion is solid.

* * * * *